United States Patent [19]

Clopton

[11] Patent Number: 5,791,455
[45] Date of Patent: Aug. 11, 1998

[54] HIGH TENSION CONVEYOR CHAIN WITH ROLLERS

[75] Inventor: Robert T. Clopton, Magnolia, Ky.

[73] Assignee: Tekno, Inc., Cave City, Ky.

[21] Appl. No.: 766,082

[22] Filed: Dec. 16, 1996

[51] Int. Cl.$^6$ ................................................. B65G 17/24
[52] U.S. Cl. ................................................. 198/779; 198/834
[58] Field of Search ..................... 198/779, 834, 198/850; 474/156, 157, 165

[56] References Cited

U.S. PATENT DOCUMENTS

| | | |
|---|---|---|
| 1,480,067 | 1/1924 | Heinkel ........................... 198/834 |
| 2,449,611 | 9/1948 | Lupton ............................ 198/779 |
| 4,993,540 | 2/1991 | van Capelleveen ............. 198/779 |
| 5,261,525 | 11/1993 | Garbagnati ..................... 198/779 |
| 5,263,575 | 11/1993 | Ledet .............................. 198/834 |
| 5,311,982 | 5/1994 | Clopton .......................... 198/779 |
| 5,330,045 | 7/1994 | Hodlewsky ...................... 198/779 |
| 5,467,860 | 11/1995 | Clopton .......................... 198/779 |

*Primary Examiner*—James R. Bidwell
*Attorney, Agent, or Firm*—Wheat, Camoriano Smith & Beres, PLC

[57] ABSTRACT

A high tension roller chain has sidebars which are contoured so that the sprocket can drive on both the roller and the sidebar or only on the sidebar, thereby permitting long stretches of chain to be driven by a single drive without damaging the rollers.

13 Claims, 3 Drawing Sheets

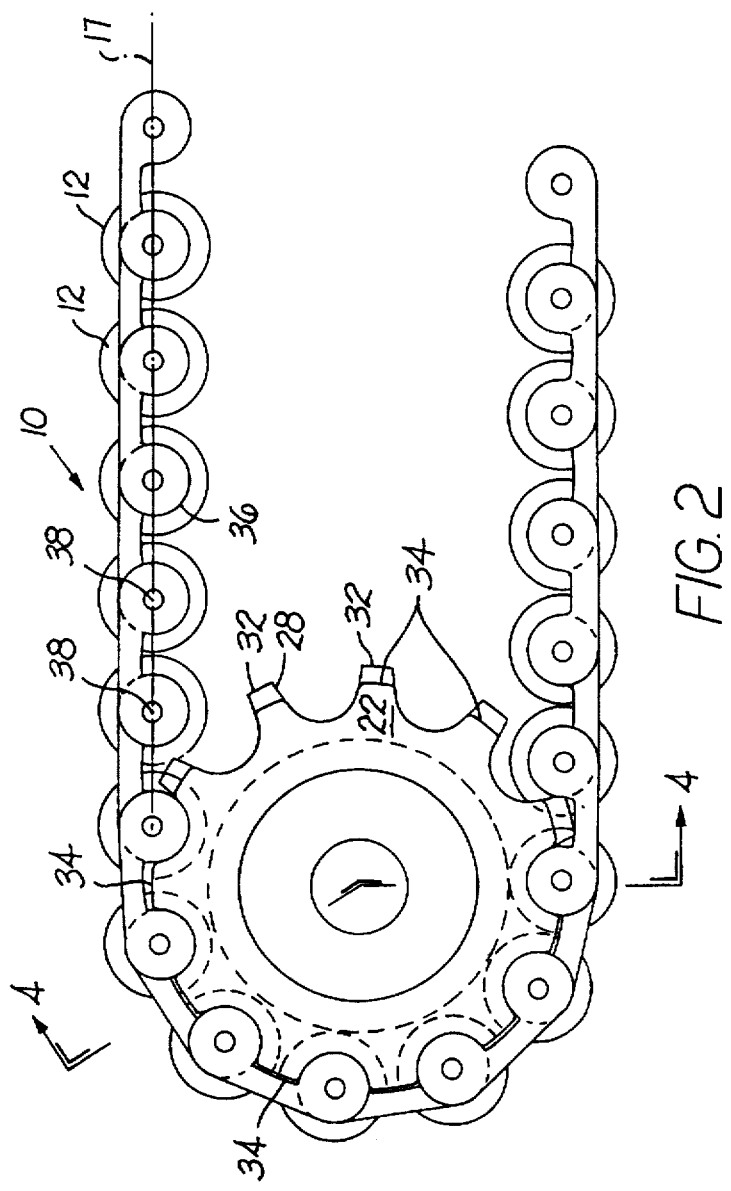
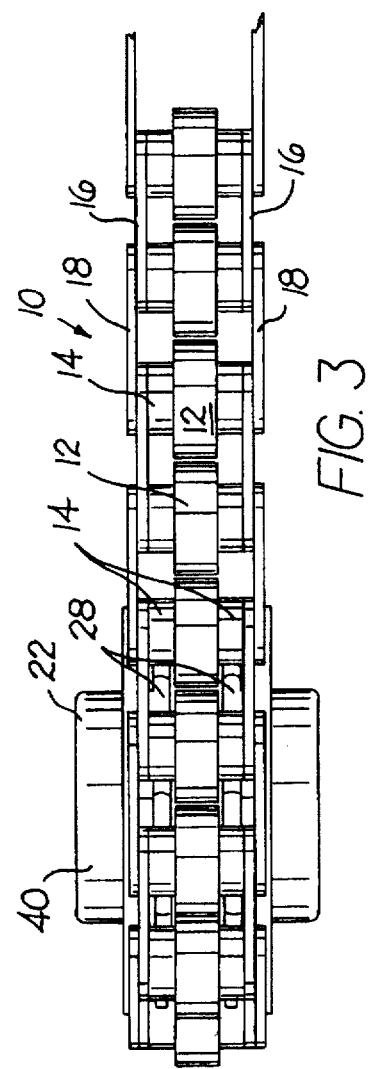
FIG. 2
FIG. 3

5,791,455

1

HIGH TENSION CONVEYOR CHAIN WITH ROLLERS

BACKGROUND OF THE INVENTION

Various types of roller chains are known. A particular type of roller chain, described in U.S. Pat. No. 5,467,860, which is hereby incorporated by reference, has a large diameter center roller with a smaller diameter roller on either side of the large diameter roller. This type of chain has been found to be particularly advantageous for use in conveying products, because, as the small diameter rollers roll on the support rails of the conveyor, they drive the large diameter center roller, which causes the product to be conveyed faster than the speed of the conveyor chain, often as much as two-and-one-half times the speed of the conveyor chain. Other designs of the same type of chain are also known, but all the designs include a large central roller with left and right adjacent smaller diameter rollers, with the small diameter rollers driving the large central roller as they roll along the rails of the conveyor.

This high speed roller chain also includes inner and outer sidebars adjacent to the small diameter rollers, and chain pins holding all the parts together. The sidebars are typically made of metal, and the rollers are typically made of plastic in order to make the chain economical and to provide the necessary friction characteristics in the roller material. As with almost all roller chains, the chain is driven by a sprocket which contacts the rollers.

The problem with this chain is that, as it becomes longer, greater force is required to drive the chain, and, eventually, the force becomes so great that the force of the sprocket against the rollers causes the rollers to break and the chain to fail. The solution to this problem has been to break the chain into shorter lengths with separate drives for each length of chain. This makes the conveyor expensive, because each drive is very expensive. It also requires coordinating the separate drives with each other, which can create additional problems and expenses.

SUMMARY OF THE INVENTION

The present invention provides a roller chain, with a large diameter central roller and two smaller diameter side rollers, which is designed to withstand much higher tension drives than prior art chains, so as to permit a much longer chain to be driven with a single drive.

The present invention provides a high speed roller chain in which the sidebars have a contour like the contour of the smaller diameter rollers so that the sprocket can drive against both the small diameter rollers and the sidebars or only against the sidebars. Driving against the sidebars takes a load off of the rollers, which means that higher tension drives can be used without the chain failing.

BRIEF DESCRIPTION OF THE DRAWINGS

FIG. 2 is a side view of a chain and sprocket made in accordance with the present invention;

FIG. 3 is a top view of the chain and sprocket of FIG. 2;

DESCRIPTION OF THE PREFERRED EMBODIMENTS

Figure 1:
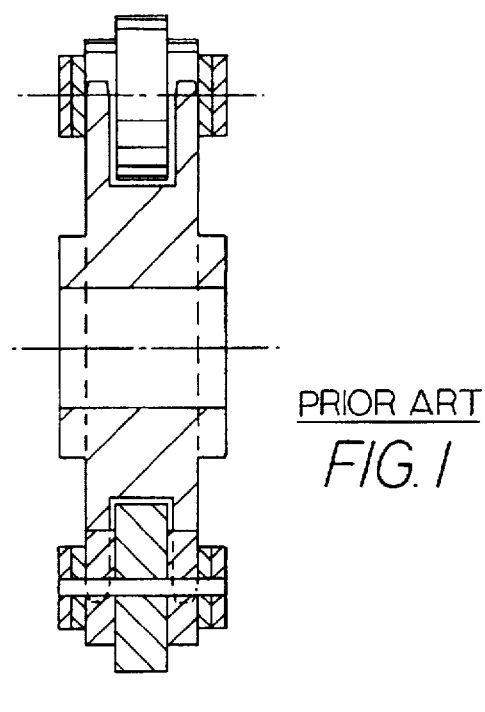
FIG. 1 is a sectional view of a prior art chain.
Figure 1A:
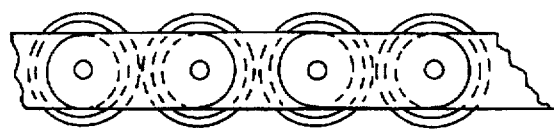
FIG. 1A is a side view of the prior art chain of FIG. 1.

FIGS. 1 and 1A show a prior art chain and sprocket combination, in which each sprocket is a double sprocket, with each pair of parallel sprocket teeth driving against a pair of outer rollers of the chain. FIG. 1A shows a side view of the prior art chain, with sidebars that have flat top and bottom surfaces. In this design, it would be impossible for the sprocket to drive against the sidebars, because there is not a sidebar surface between each pair of links against which a sprocket could push to drive the chain.

Figure 7:
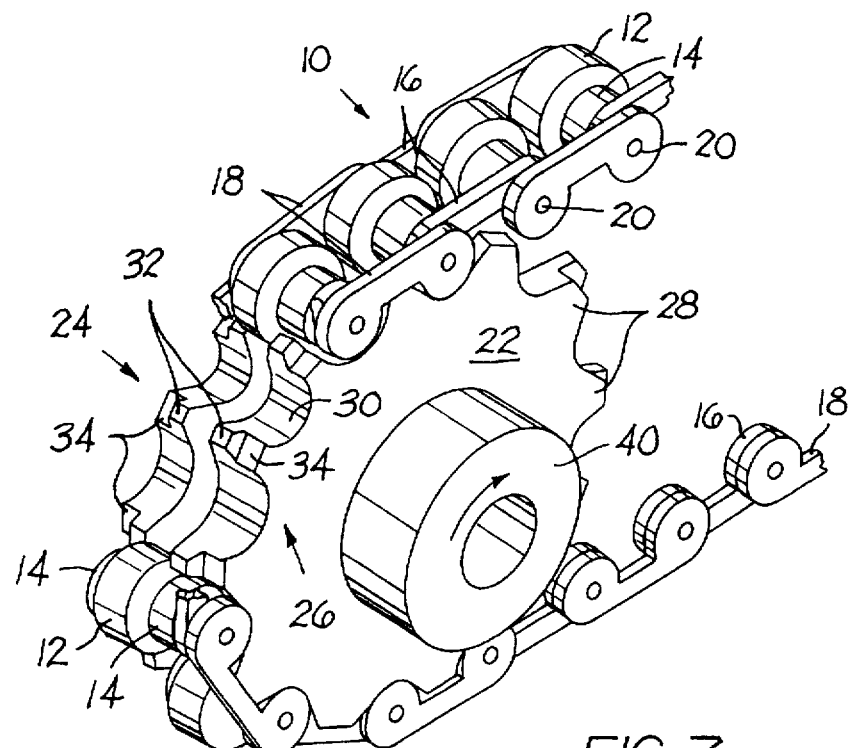
FIG. 7 is a perspective view of the chain and sprocket of FIG. 2, with part of the chain broken away.

Looking now at FIG. 7, we can see a perspective view of one embodiment of a chain and sprocket made in accordance with the present invention, with the chain partially broken away. The chain 10 includes a plurality of links. Each link includes a large diameter central roller 12, two smaller diameter rollers 14 located at the left and right sides of the large diameter roller 12, two inner sidebars 16, two outer sidebars 18, and a chain pin 20, which extends through the bores of the adjacent rollers 12, 14 and through holes 21 in the sidebars 16, 18 to hold the chain together. The bores 19 of the rollers and the holes 21 in the sidebars can be seen in FIG. 4. The large diameter roller 12 and two smaller diameter rollers 14 are coaxial, with the bores 19 aligned, and the smaller diameter rollers 14 are identical to each other.

The sprocket 22 is a double sprocket, having left and right sets 24, 26 of teeth 28. The curved profile 30 of the sprocket teeth 28 corresponds to the curvature of the smaller diameter outer rollers 14 and to the curvatures of the ends of the inner and outer sidebars 16, 18, which are identical to the curvature of the outer rollers 14. Each sprocket tooth 28 has portions of different heights. The inner portion 32 of the tooth 28 is longer than the outer portion 34 of the tooth 28, because the tooth 28 can wrap farther around the outer roller 14 than it can wrap around the inner and outer sidebars 16, 18. It can be seen in this view that, as the sprocket 22 rotates, each sprocket tooth 28 contacts and drives against its respective outer roller 14, inner sidebar 16, and outer sidebar 18, so the drive force is not borne entirely by the small diameter outer rollers 14 of the chain 10.

FIG. 2 is a side view of the same chain 10 and sprocket 22 as in FIG. 7. An imaginary line 17 is drawn through the axes of the pins 20 to define the centerline 17 of the chain 10. It can be seen that even the lower tooth portions 34 extend above that imaginary centerline 17 of the chain (or above the axis of the pin) as the sprocket drives against the sidebars 16, 18. This view also shows that, in this embodiment, the circular profile 36 of the ends of the inner and outer sidebars 16, 18 forms greater than half a circle, again so that the outer portion 34 of the tooth 28 can extend beyond the axis 38 of the pin 20 when it is driving against the curved profile 36 of the ends of the sidebars 16, 18. It is not absolutely necessary for the outer portion 34 of the tooth 28 to extend beyond the axis 38 of the pin in order for the chain to drive properly, but it is preferable, because, if the tooth does not extend beyond the axis, there may be some tendency for the chain to be pushed out of the sprocket when it is driven under high tension.

FIG. 3 is a top view of the chain 10 and sprocket 22 of FIG. 2. In this view it can be seen that the sprocket teeth 28 drive against every small diameter roller 14, and against the curved profile 36 at both ends of each inner and outer sidebar 16, 18.

Figure 4:
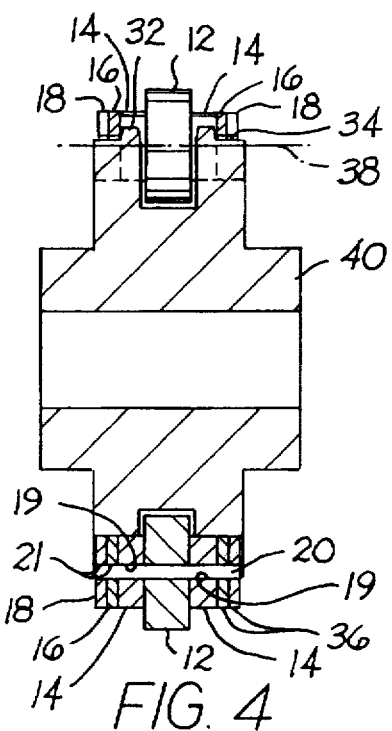
FIG. 4 is a view taken along the section 4—4 of FIG. 2.

FIG. 4 is a sectional view taken along the section 4—4 of FIG. 2. In the top portion of FIG. 4, the inner sidebars 16 are in section, and we see the ends of the outer sidebars 18. It can be seen in this view that the inner portion 32 of the tooth 28 extends far above the axis 38 of the pin and thus far above the centerline 17 of the chain 10, as it drives against the outer roller 14, and the outer portion 34 of the tooth 34 extends slightly beyond the axis 38 of the chain pin (beyond the centerline 17 of the chain 10) as it drives against the curved profiles 36 of the inner and outer sidebars 16, 18. The bottom part of FIG. 4 is a section taken straight through the pin 20, showing that the curved profile 36 of the inner and outer sidebars 16, 18 is identical to the curvature of the outer rollers 14.

Figure 5:
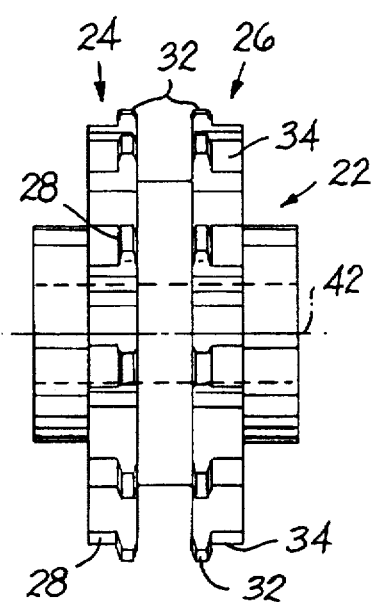
FIG. 5 is an end view of the sprocket of FIG. 2.

FIG. 5 shows the sprocket 22, with left and right sets 24, 26 of teeth 28. Each tooth 28 has portions of two different heights. The inner portion 32 of each tooth extends a greater distance from the axis 42 of the sprocket 22 than does the outer portion 34 of the tooth, permitting the inner portions 32 to wrap farther around the rollers 14 than the outer portions 34 wrap around the curved profiles 36 of the sidebars 16, 18. Both the inner portion 32 and the outer portion 34 of each tooth extends farther out from the axis 42 of the sprocket 22 than does the axis 38 of the chain pins 20 of the chain 10 being driven by the sprocket 22.

Figure 6:
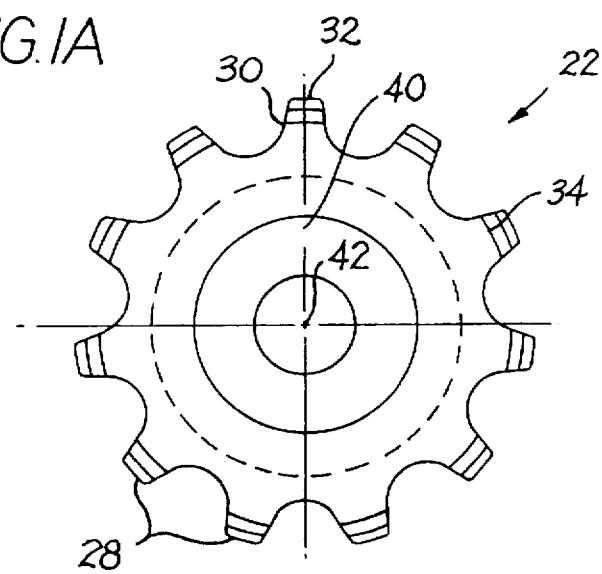
FIG. 6 is a side view of the sprocket of FIG. 2.

FIG. 6 is a side view of the sprocket 22, showing the hub 40 and the tooth profile 30, which corresponds to the curvature of the outer rollers 14 and the curved profiles 36 of the sidebars 16, 18. This view also shows the two different height portions 32, 34 of each tooth 28.

Figure 8:
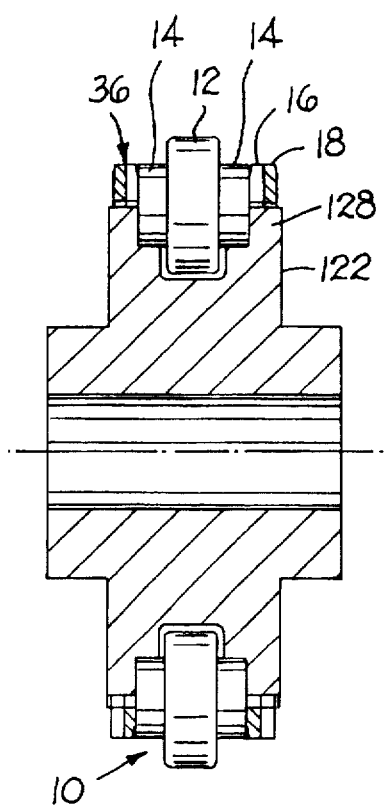
FIG. 8 shows a second embodiment of the present invention, in which the sprocket teeth drive only against the sidebars of the chain.

FIG. 8 is a sectional view of a second embodiment of the invention, which is very similar to the first embodiment. In this second embodiment, the chain 10 is identical to the chain of the first embodiment; only the sprocket 122 is different. The only difference is that there is no inner portion of the tooth 128 to drive against the rollers 14. The sprocket teeth 128 of the sprocket 122 drive only against the curved profile 36 of the ends of the inner and outer sidebars 16, 18. In this embodiment, the sprocket 122 is recessed in the center to provide a space for the large diameter center roller 12 and the smaller diameter side rollers 14, and the teeth 128 are identical to the outer portion 34 of the teeth 28 of the first embodiment, contacting and driving against the curved profile 36 of the sidebars 16, 18.

What is claimed is:

1. A conveyor chain, comprising a plurality of interconnected links, each link including:
   a large diameter central roller, having a central bore and left and right ends;
   left and right smaller diameter rollers, each smaller diameter roller having a central bore, with the left smaller diameter roller adjacent the left end of said large diameter roller and the right smaller diameter roller adjacent the right end of said large diameter roller, with the central bores of the adjacent rollers aligned;
   a left inner sidebar, a left outer sidebar, a right inner sidebar, and a right outer sidebar, each sidebar having a forward hole and a rear hole, said left and right sidebars lying adjacent to the left and right sides of said aligned rollers, respectively; and
   a chain pin extending through one of the holes of each of the two left sidebars, through the aligned bores of the rollers, and through one of the holes of each of the two right sidebars, said chain pin having an axis;
   wherein the left and right inner sidebars have ends which are contoured to have the same outside diameter as the smaller diameter rollers, so that a single sprocket tooth can contact and drive against one of said inner sidebars and against its adjacent smaller diameter roller.

2. A conveyor chain as recited in claim 1, wherein said contoured ends of said inner sidebars define at least half of a circle.

3. A conveyor chain as recited in claim 2, wherein the ends of said outer sidebars have the same contour as the ends of the inner sidebars, so that a single sprocket tooth can drive against the smaller diameter roller and both the inner and outer sidebars.

4. A conveyor chain as recited in claim 2 in combination with a sprocket, comprising left and right sets of parallel sprocket teeth, wherein a pair of left and right parallel sprocket teeth contact the left smaller diameter roller, the left inner sidebar, the right smaller diameter roller, and the right inner sidebar so as to drive against both the smaller diameter rollers and both the inner sidebars on a link.

5. A conveyor chain and sprocket combination as recited in claim 4, wherein each of said sprocket teeth has portions of two different heights, the higher tooth portion contacting the smaller diameter roller, and the lower tooth portion contacting the inner sidebar.

6. A conveyor chain and sprocket combination as recited in claim 5, wherein the lower tooth portion contacts both its respective inner sidebar and its respective outer sidebar.

7. A conveyor chain as recited in claim 2, in combination with a sprocket, having left and right sets of parallel sprocket teeth, wherein one pair of left and right parallel sprocket teeth contacts and drives against the left inner and outer sidebars and the right inner and outer sidebars, respectively.

8. A conveyor chain and sprocket combination as recited in claim 4, wherein the portion of the sprocket tooth which contacts the sidebar extends beyond the axis of the pin.

9. A conveyor chain as recited in claim 2, in combination with a sprocket, comprising left and right sets of parallel sprocket teeth, wherein a pair of left and right parallel sprocket teeth contacts the left inner and outer sidebars and the right inner and outer sidebars on a link, respectively.

10. A chain and sprocket combination, comprising:
   a chain, comprising:
      a plurality of interconnected links, each link including:
         a large diameter central roller, having a central bore and left and right ends;
         left and right smaller diameter rollers, each smaller diameter roller having a central bore, with the left smaller diameter roller adjacent the left end of said large diameter roller and the right smaller diameter roller adjacent the right end of said large diameter roller, with the central bores of the adjacent rollers aligned;
         a left inner sidebar, a left outer sidebar, a right inner sidebar, and a right outer sidebar, each sidebar having a forward hole and a rear hole, said left and right sidebars lying adjacent to the left and right sides of said aligned rollers, respectively; and
         a chain pin extending through one of the holes of each of the two left sidebars, through the aligned bores of the rollers, and through one of the holes of each of the two right sidebars, said chain pin having an axis;
      wherein the left and right inner sidebars have ends which are contoured to have the same outside diameter as the smaller diameter rollers; and
   a sprocket, comprising:
      a hub;
      left and right sets of parallel sprocket teeth projecting outwardly from the hub;

wherein, as the sprocket rotates, each pair of left and right parallel sprocket teeth contacts and drives against a respective pair of left inner and outer sidebars and right inner and outer sidebars, respectively.

11. A chain and sprocket combination as recited in claim 10, wherein said sprocket teeth also drive against the outer rollers of the chain.

12. A chain and sprocket combination as recited in claim 11, wherein each of said sprocket teeth has portions at two different heights, with the higher portion contacting the outer roller and the lower portion contacting the inner and outer sidebars.

13. A chain and sprocket combination as recited in claim 10, wherein the portions of said sprocket teeth which contact the inner and outer sidebars extend farther from the axis of the sprocket than do the axes of the chain pins of the links which are in contact with the sprocket.

* * * * *